US012266891B2

(12) United States Patent
Morello et al.

(10) Patent No.: US 12,266,891 B2
(45) Date of Patent: Apr. 1, 2025

(54) ELECTRICAL CONNECTOR WITH A CLAMPING CONNECTOR LOCK

(71) Applicant: Aptiv Technologies AG, Schaffhausen (CH)

(72) Inventors: John Morello, Warren, OH (US); James M. Rainey, Warren, OH (US)

(73) Assignee: Aptiv Technologies AG, Schaffhausen (CH)

(*) Notice: Subject to any disclaimer, the term of this patent is extended or adjusted under 35 U.S.C. 154(b) by 437 days.

(21) Appl. No.: 17/851,300

(22) Filed: Jun. 28, 2022

(65) Prior Publication Data

US 2023/0268692 A1 Aug. 24, 2023

Related U.S. Application Data

(60) Provisional application No. 63/312,506, filed on Feb. 22, 2022.

(51) Int. Cl.

*H01R 13/641* (2006.01)
*H01R 13/627* (2006.01)
*H01R 13/639* (2006.01)

(52) U.S. Cl.

CPC ....... *H01R 13/641* (2013.01); *H01R 13/6277* (2013.01); *H01R 13/639* (2013.01)

(58) Field of Classification Search

CPC . H01R 13/641; H01R 13/6277; H01R 13/639
See application file for complete search history.

(56) References Cited

U.S. PATENT DOCUMENTS

| | | | | |
|---|---|---|---|---|
| 7,455,550 B1 * | 11/2008 | Sykes | .................. | H01R 13/506 439/578 |
| 9,711,905 B2 * | 7/2017 | Lappoehn | .............. | H01R 13/64 |
| 10,367,304 B2 * | 7/2019 | Mühlfellner | ........... | H01R 24/38 |

* cited by examiner

*Primary Examiner* — Ross N Gushi
(74) *Attorney, Agent, or Firm* — Billion & Armitage

(57) ABSTRACT

An electrical connector assembly includes a first electrical connector housing configured to retain an electrical terminal. The first electrical connector housing has a first shroud surrounding the electrical terminal. The electrical connector assembly also includes a second electrical connector housing configured to retain a mating electrical terminal. The second electrical connector housing has a second shroud surrounding the mating electrical terminal that is configured to be received within the first shroud. The second electrical connector housing includes a circular band in which the first shroud is received. The circular band defines a gap therein and is configured to apply a circumferential clamping force to the first shroud when the gap is narrowed by a lateral force applied to the second electrical connector housing, thereby decreasing an effective internal diameter of the circular band.

15 Claims, 10 Drawing Sheets

ELECTRICAL CONNECTOR WITH A CLAMPING CONNECTOR LOCK

CROSS-REFERENCE TO RELATED APPLICATION

This application claims benefit of priority to U.S. Application No. 63/312,506 filed on Feb. 22, 2022, the entire disclosure of which is hereby incorporated by reference.

TECHNICAL FIELD

This disclosure is directed to an electrical connector with a clamping connector lock.

BACKGROUND

Crush ribs have been used in electrical connectors to provide a tighter, more vibration resistant connections. However, these crush ribs have several drawbacks. First, they increase engagement force needed to mate the electrical connector. Second, the crush ribs may relax over time due to polymer creep. Third, the effectiveness of the crush ribs decrease after multiple unmating/unmating cycles. This list of crush rib deficiencies in not exhaustive.

SUMMARY

According to one or more aspects of the present disclosure, an electrical connector assembly includes a first electrical connector housing configured to retain an electrical terminal. The first electrical connector housing has a first shroud surrounding the electrical terminal. The electrical connector assembly also includes a second electrical connector housing configured to retain a mating electrical terminal. The second electrical connector housing has a second shroud surrounding the mating electrical terminal that is configured to be received within the first shroud. The second electrical connector housing includes a circular band in which the first shroud is received. The circular band defines a gap therein and is configured to apply a circumferential clamping force to the first shroud when the gap is narrowed by a lateral force applied to the second electrical connector housing, thereby decreasing an effective internal diameter of the circular band.

In one or more embodiments of the electrical connector assembly according to the previous paragraph, the electrical connector assembly further includes a sliding member attached to the second electrical connector housing that is movable in a longitudinal direction. The sliding member defines a first ramped surface and the second electrical connector housing defines a second ramped surface that cooperates with the first ramped surface to translate a longitudinal force applied to the sliding member to the lateral force applied to the second electrical connector housing.

In one or more embodiments of the electrical connector assembly according to any one of the previous paragraphs, the sliding member is a connector position assurance device.

In one or more embodiments of the electrical connector assembly according to any one of the previous paragraphs, the connector position assurance device is held in a position until released to move in the longitudinal direction by a lock nib defined by the first shroud as the second shroud is inserted within the first shroud.

In one or more embodiments of the electrical connector assembly according to any one of the previous paragraphs, the second electrical connector housing includes a locking arm configured to engage the lock nib and retain the first and second electrical connector housing in a fully mated condition.

In one or more embodiments of the electrical connector assembly according to any one of the previous paragraphs, the first shroud defines a lock nib that cooperates with a third ramped surface defined by the second electrical connector housing to pull the first electrical connector housing and the second electrical connector housing together in response to the lateral force applied to the second electrical connector housing.

In one or more embodiments of the electrical connector assembly according to any one of the previous paragraphs, the second shroud defines a plurality of elongate pads located proximate a base of the second shroud that are configured to be in an interference fit with the first shroud.

In one or more embodiments of the electrical connector assembly according to any one of the previous paragraphs, the plurality of elongate pads are configured to deform the first shroud more than the first shroud deforms the plurality of elongate pads.

In one or more embodiments of the electrical connector assembly according to any one of the previous paragraphs, the plurality of elongate pads are evenly spaced around the base of the second shroud.

In one or more embodiments of the electrical connector assembly according to any one of the previous paragraphs, the plurality of elongate pads include 4 pads spaced at 90 degree intervals around the base of the second shroud.

According to one or more aspects of the present disclosure, an electrical connector assembly includes a first electrical connector housing configured to retain an electrical terminal. The first electrical connector housing has a first shroud surrounding the electrical terminal and lock nib extending from the first shroud. The electrical connector assembly further includes a second electrical connector housing configured to retain a mating electrical terminal. The second electrical connector housing has a second shroud surrounding the mating electrical terminal configured to be received within the first shroud. The second electrical connector housing defines a gap therein that is narrowed by a lateral force applied to the second electrical connector housing. The electrical connector assembly additionally includes a sliding member attached to the second electrical connector housing that is movable in a longitudinal direction. The sliding member defines a first ramped surface and the second electrical connector housing defines a second ramped surface that cooperates with the first ramped surface to translate a longitudinal force applied to the sliding member to the lateral force applied to the second electrical connector housing, thereby narrowing the gap in the second electrical connector housing. The lock nib cooperates with a ramped surface defined by the second electrical connector housing to pull the first electrical connector housing and the second electrical connector housing together as the gap is narrowed in response to the lateral force applied to the second electrical connector housing.

In one or more embodiments of the electrical connector assembly according to the previous paragraph, the sliding member is a connector position assurance device.

In one or more embodiments of the electrical connector assembly according to any one of the previous paragraphs, the connector position assurance device is held in a position until released to move in the longitudinal direction by the lock nib as the second shroud is inserted within the first shroud.

In one or more embodiments of the electrical connector assembly according to any one of the previous paragraphs, the second electrical connector housing includes a locking arm configured to engage the lock nib and retain the first and second electrical connector housing in a fully mated condition.

According to one or more aspects of the present disclosure, an electrical connector assembly includes a first electrical connector housing configured to retain an electrical terminal. The first electrical connector housing having a first shroud surrounding the electrical terminal. The electrical connector assembly also includes a second electrical connector housing configured to retain a mating electrical terminal and having a second shroud surrounding the mating electrical terminal configured to be received within the first shroud, wherein the second shroud defines a plurality of elongate pads located proximate a base of the second shroud that are configured to be in an interference fit with the first shroud.

In one or more embodiments of the electrical connector assembly according to the previous paragraph, the plurality of elongate pads are configured to deform the first shroud more than the first shroud deforms the plurality of elongate pads.

In one or more embodiments of the electrical connector assembly according to any one of the previous paragraphs, the plurality of elongate pads are evenly spaced around the base of the second shroud.

In one or more embodiments of the electrical connector assembly according to any one of the previous paragraphs, the plurality of elongate pads include four pads spaced at 90 degree intervals around the base of the second shroud.

BRIEF DESCRIPTION OF THE DRAWINGS

The present invention will now be described by way of example with reference to the accompanying drawings, in which.

In the following description, similar elements of the various embodiments described share the same last two digits of the reference numbers.

DETAILED DESCRIPTION

Figure 1:
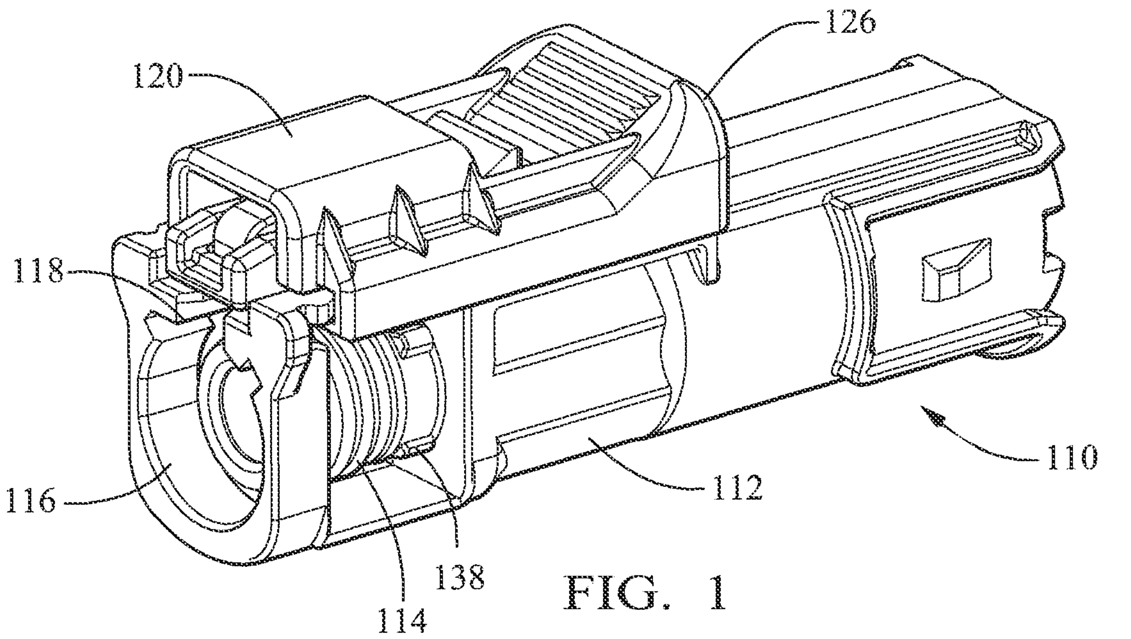
FIG. 1 shows a perspective view of an electrical connector with a clamping connector lock according to some embodiments.
Figure 2:
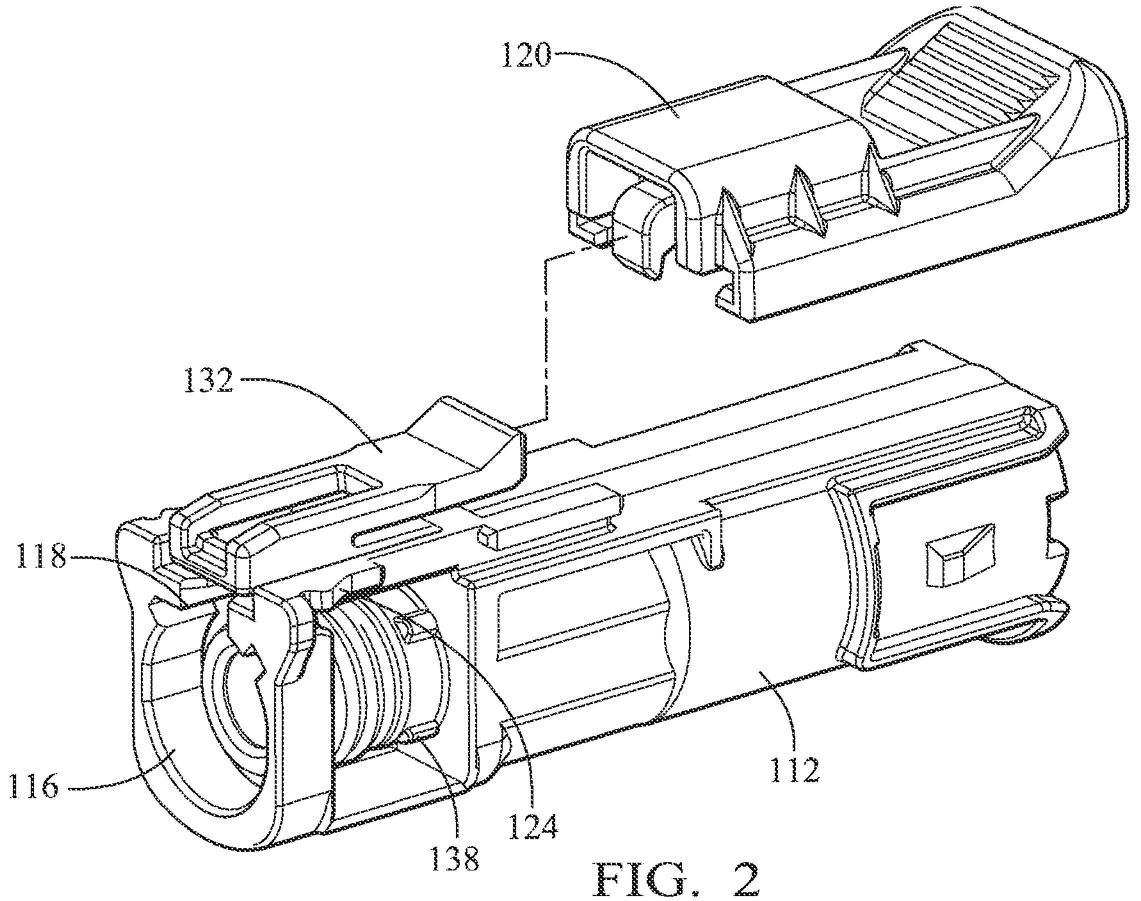
FIG. 2 shows an exploded view of the electrical connector of FIG. 1 according to some embodiments.
Figure 3:
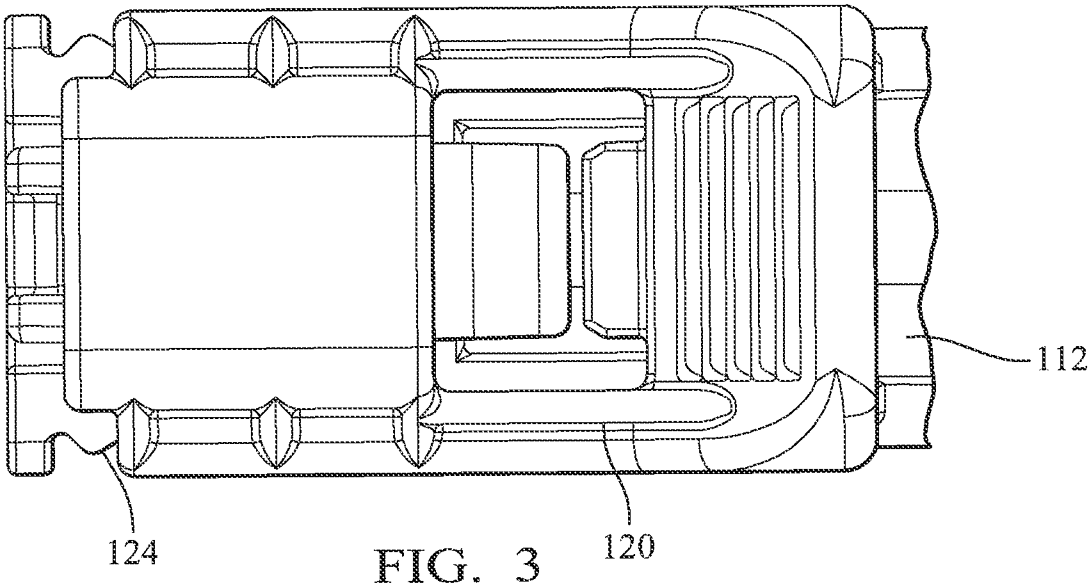
FIG. 3 shows a top view of the electrical connector of FIG. 1 according to some embodiments.
Figure 4:
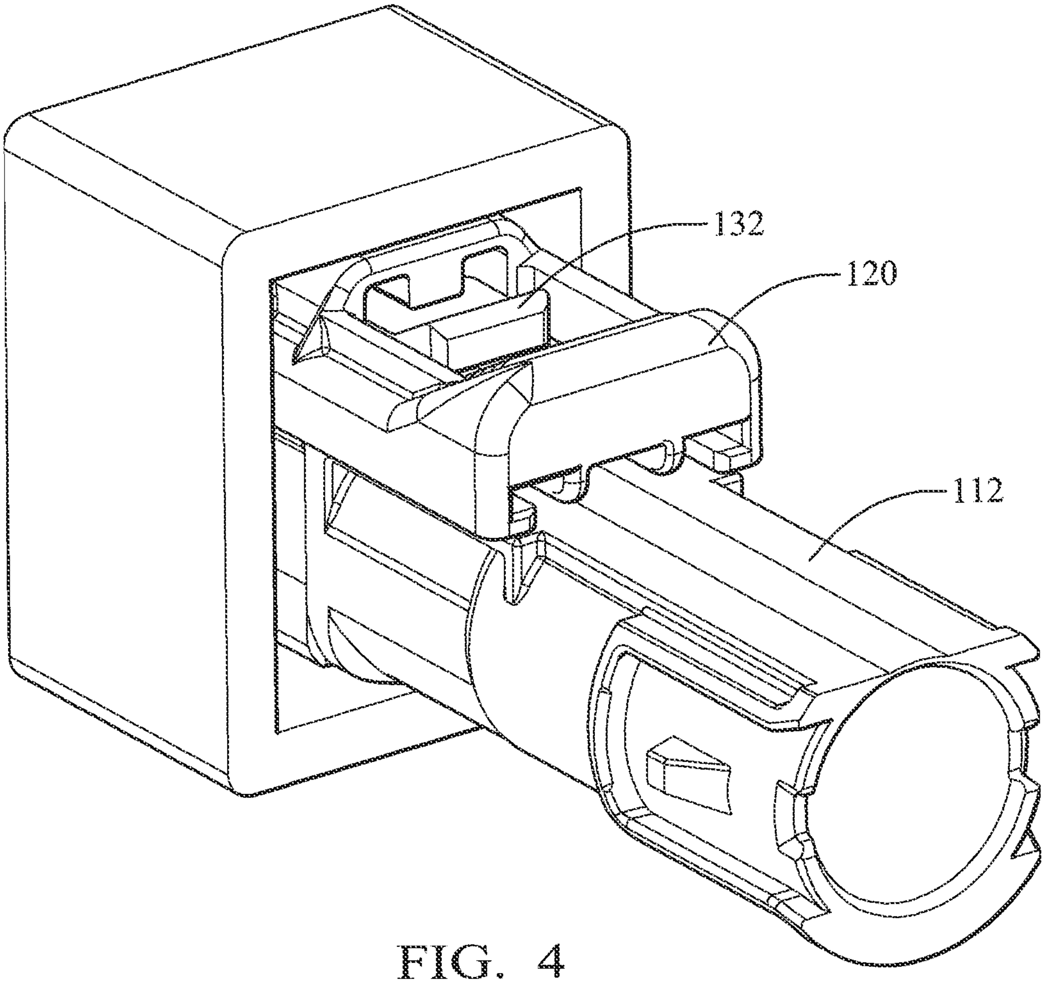
FIG. 4 shows a perspective view of the electrical connector of FIG. 1 within a USCAR compliant shroud according to some embodiments.
Figure 5:
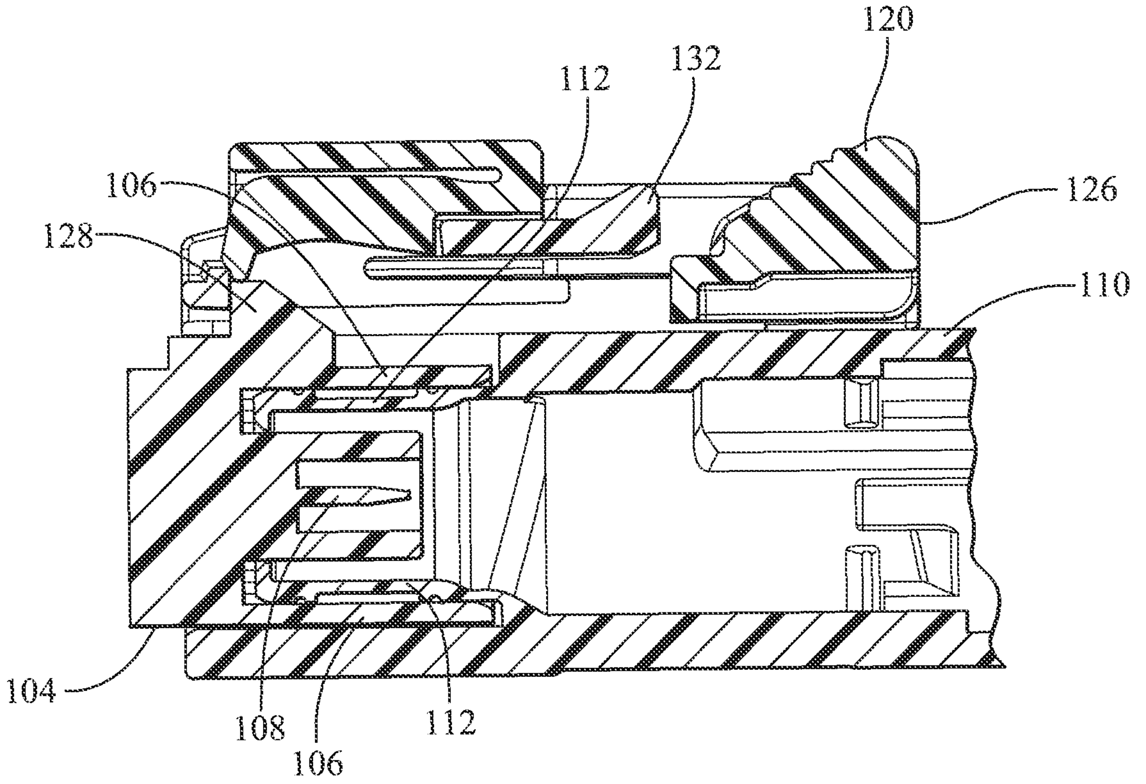
FIG. 5 shows a cross section view of the electrical connector of FIG. 1 in a staged position according to some embodiments.
Figure 6:
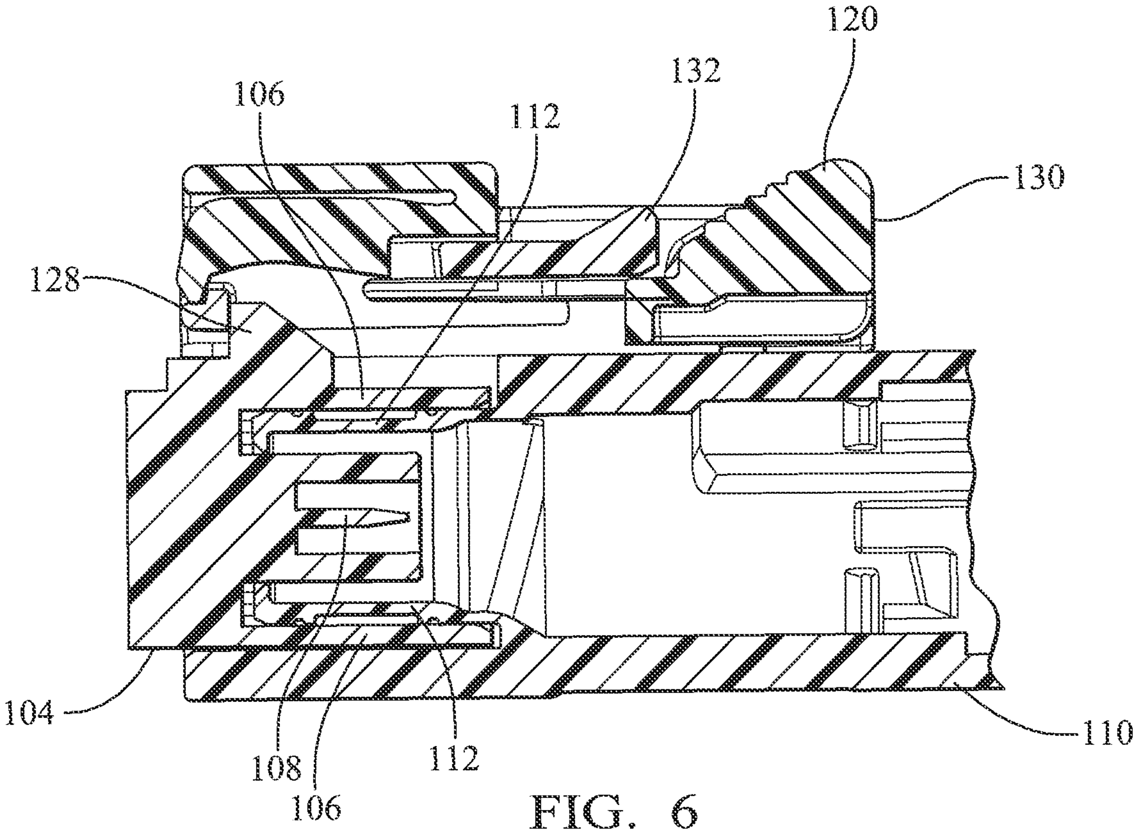
FIG. 6 shows a cross section view of the electrical connector of FIG. 1 in a locked position according to some embodiments.
Figure 7:
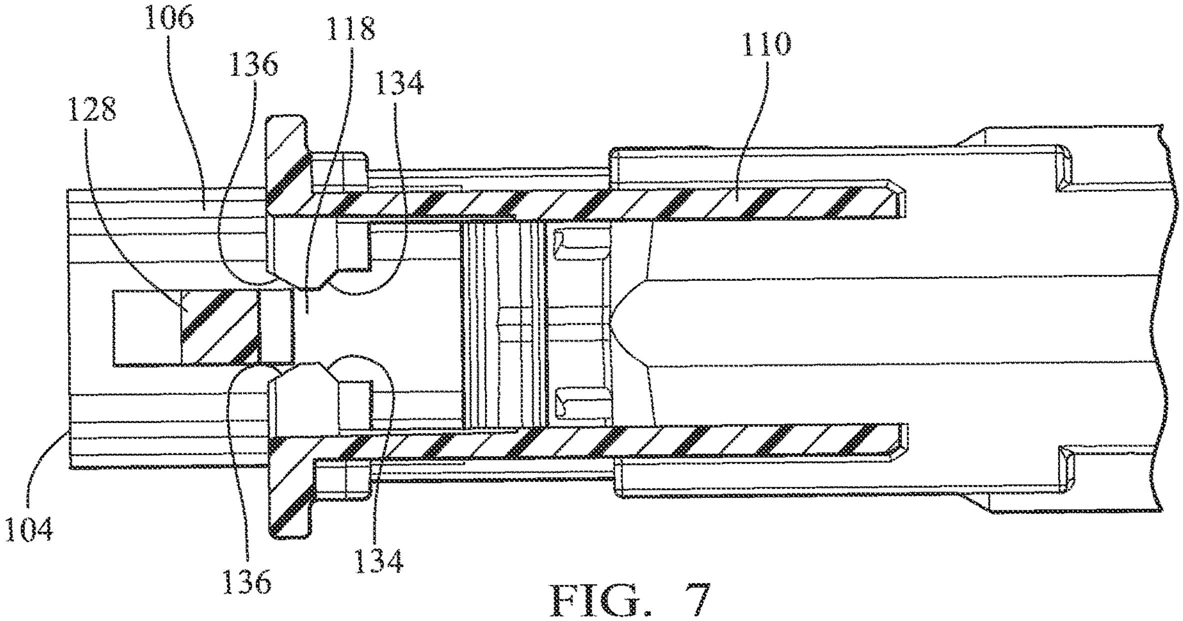
FIG. 7 shows a top view of the electrical connector of FIG. 1 partially mated to a mating connector without showing a connector position assurance (CPA) device shown in shown in FIGS. 1-6 according to some embodiments.
Figure 8:
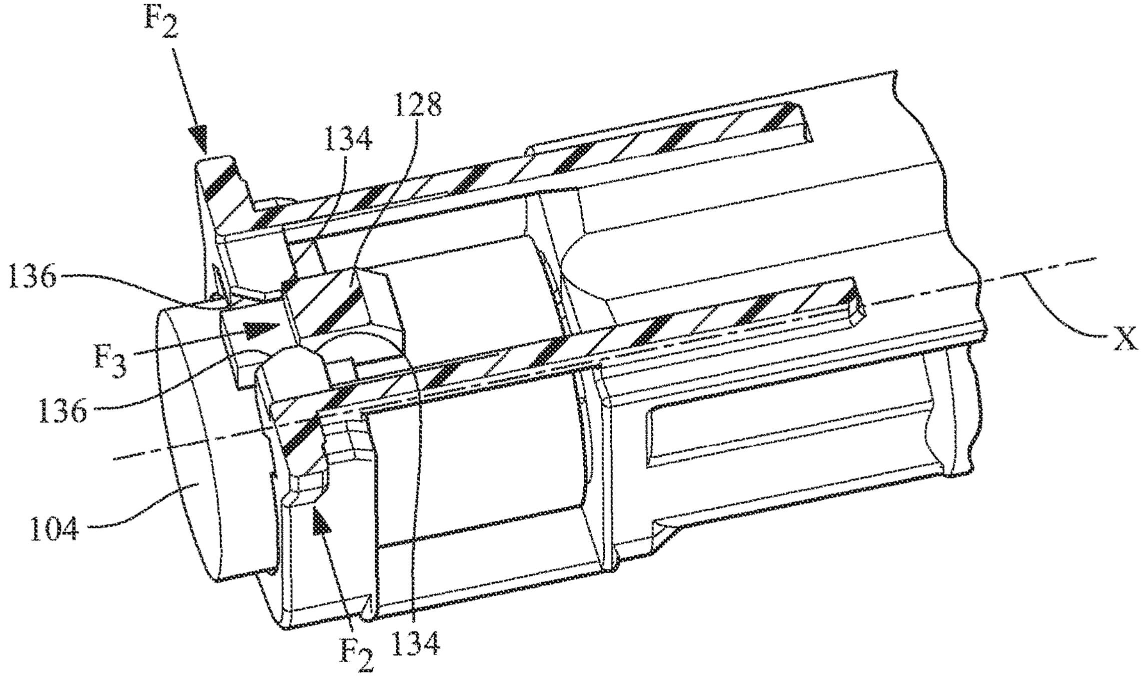
FIG. 8 shows a perspective top view of the electrical connector of FIG. 1 fully mated to the mating connector without showing the CPA device shown in FIGS. 1-6 according to some embodiments.
Figure 9:
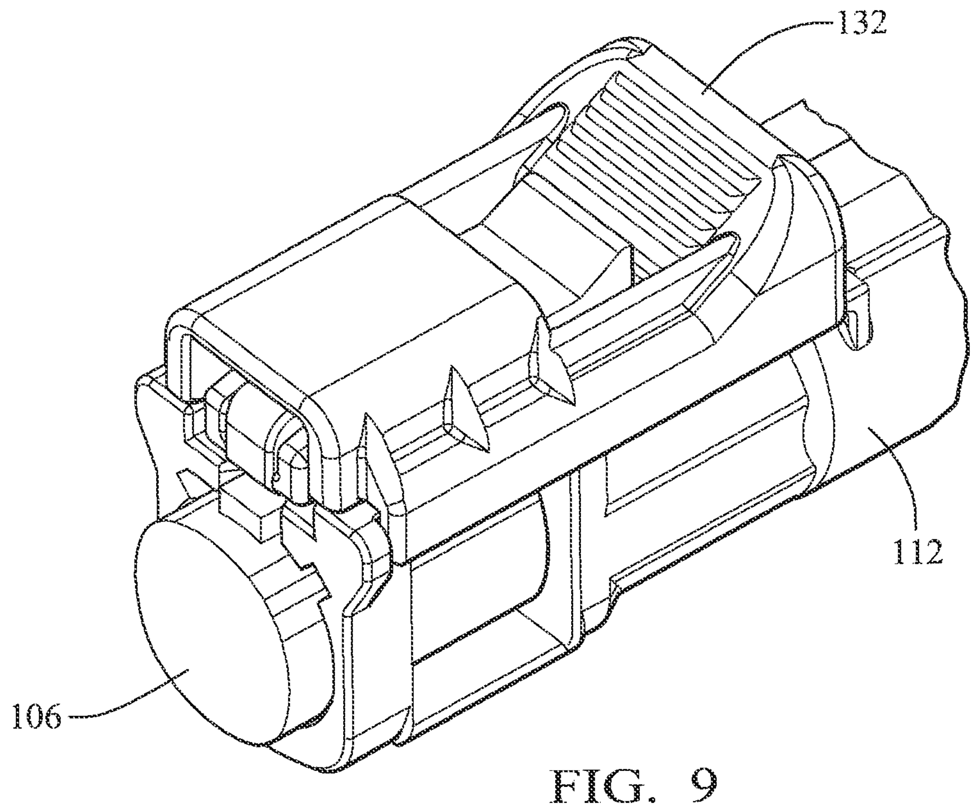
FIG. 9 shows a perspective top view of the electrical connector of FIG. 1 fully mated with the mating connector according to some embodiments.
Figure 10:
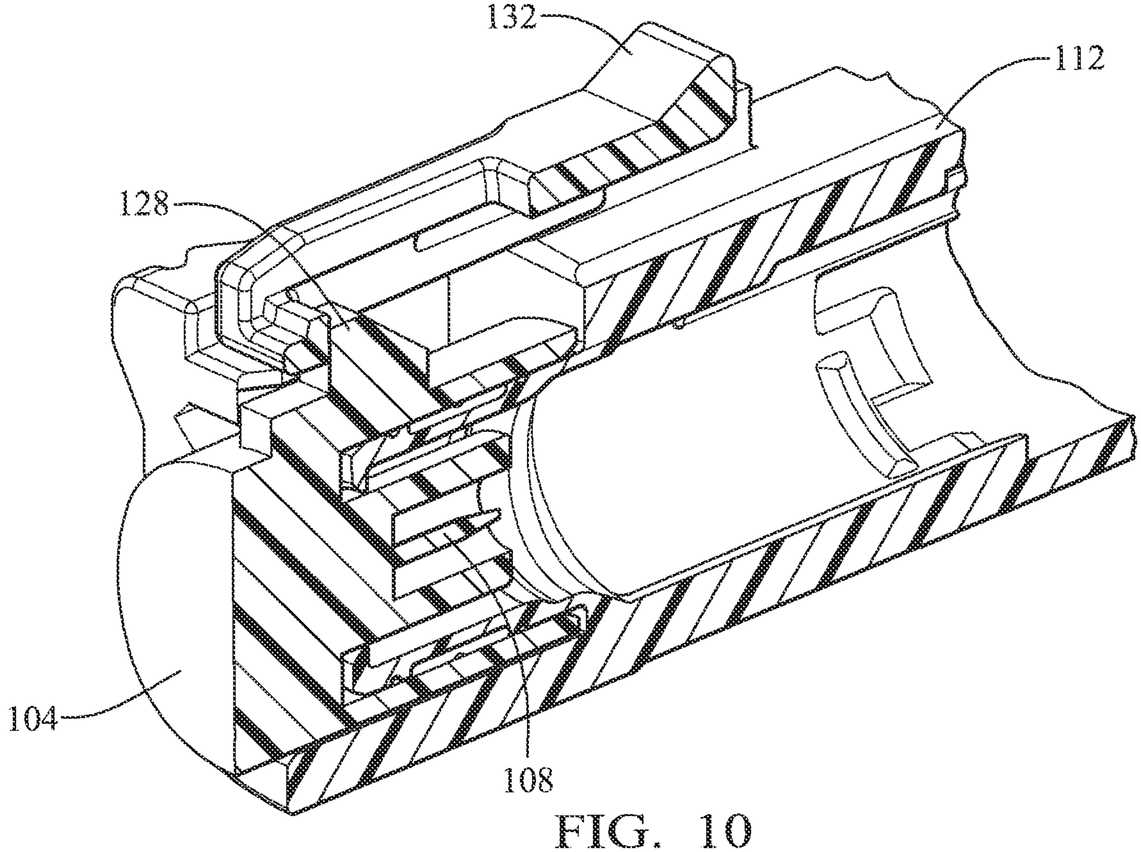
FIG. 10 shows a cross section view of the electrical connector of FIG. 1 fully mated with the mating connector with the CPA clamp removed according to some embodiments.
Figure 11:
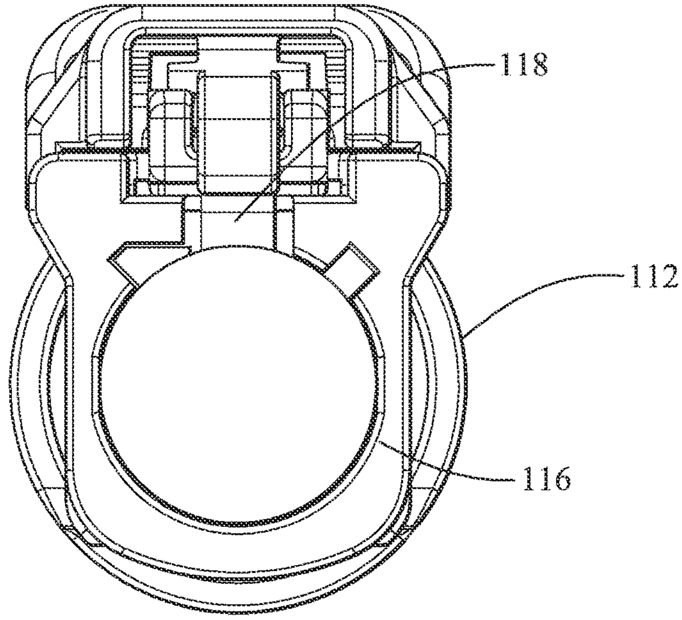
FIG. 11 shows an end view of the electrical connector of FIG. 1 fully mated with the mating connector with the mating connector in cross section according to some embodiments.
Figure 12:
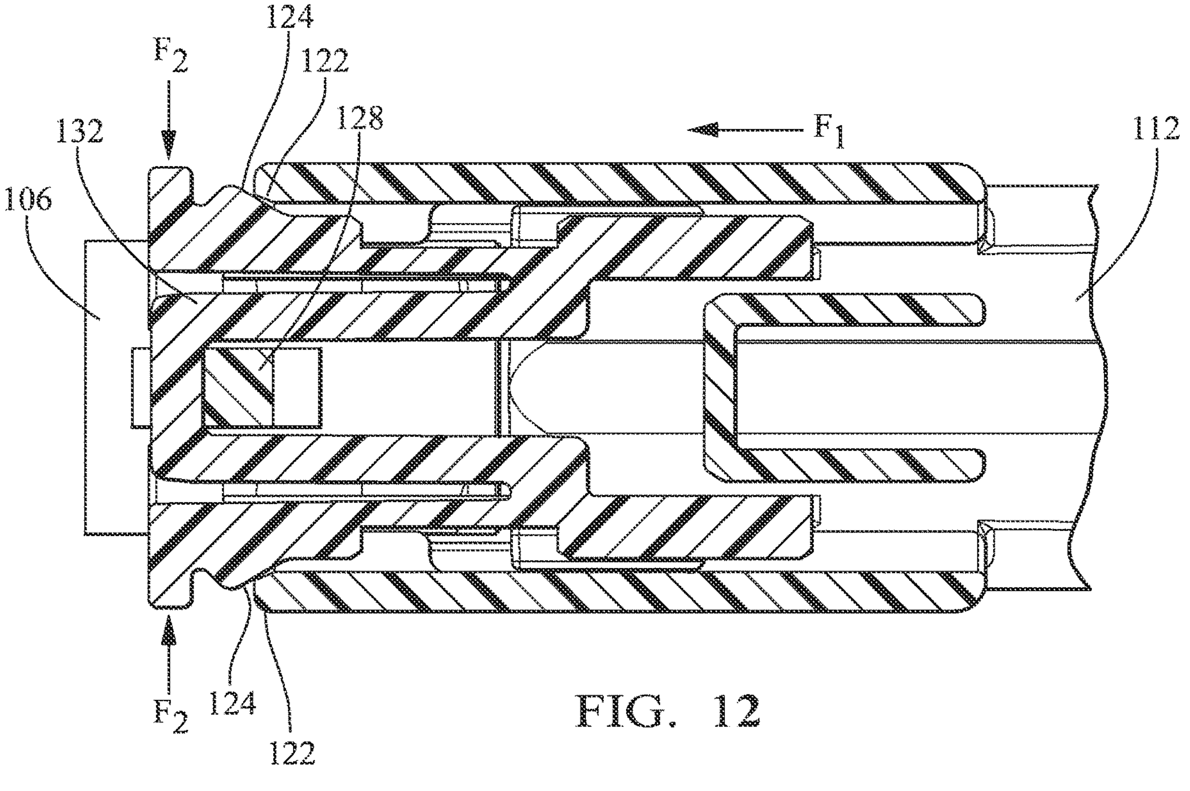
FIG. 12 shows a top view of the electrical connector of FIG. 1 fully mated with the mating connector with the CPA clamp in cross section according to some embodiments.
Figure 13A:
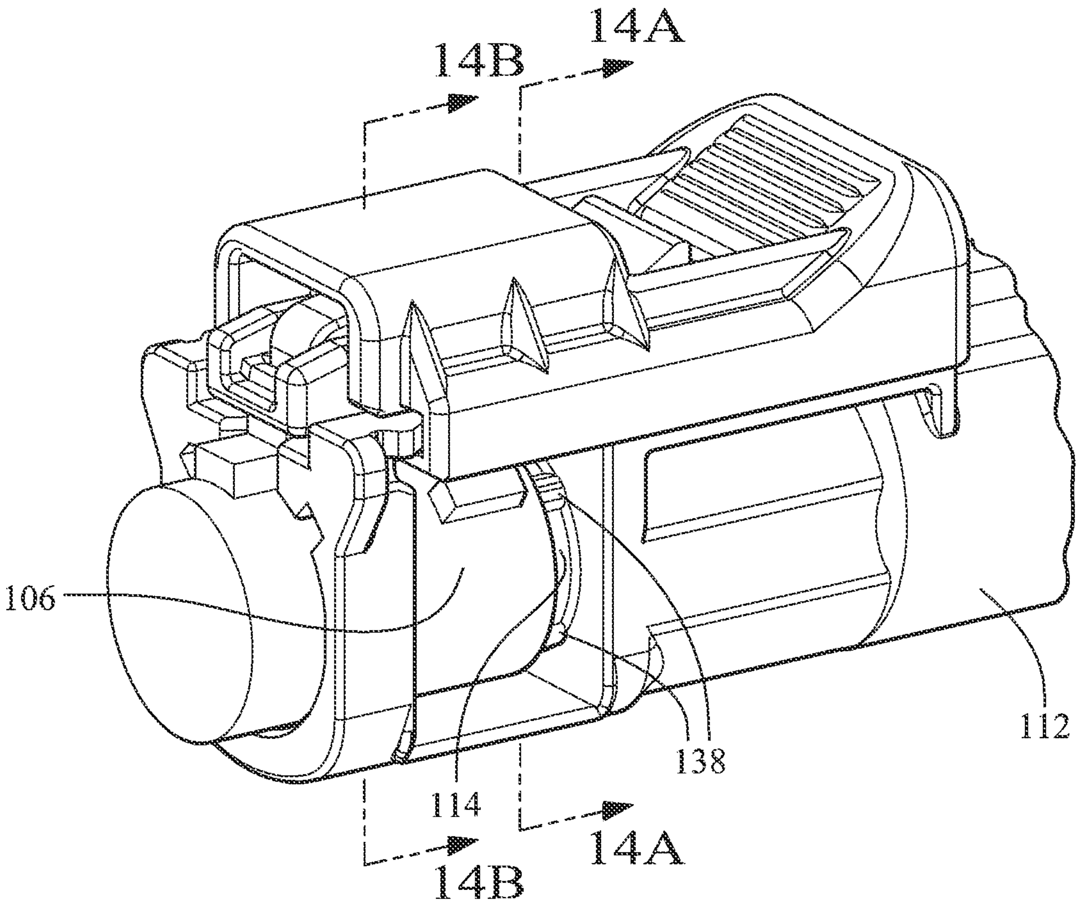
FIG. 13A shows a perspective view of precision pads on the electrical connector of FIG. 1 in a fully mated condition with the mating connector according to some embodiments.
Figure 13B:
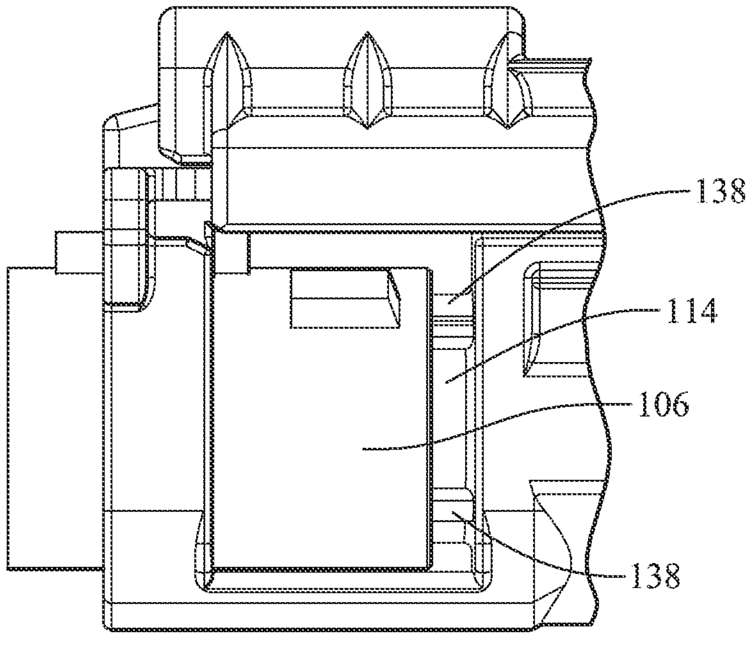
FIG. 13B shows a side view of the precision pads on the electrical connector of FIG. 1 in a fully mated condition with the mating connector according to some embodiments.
Figure 14A:
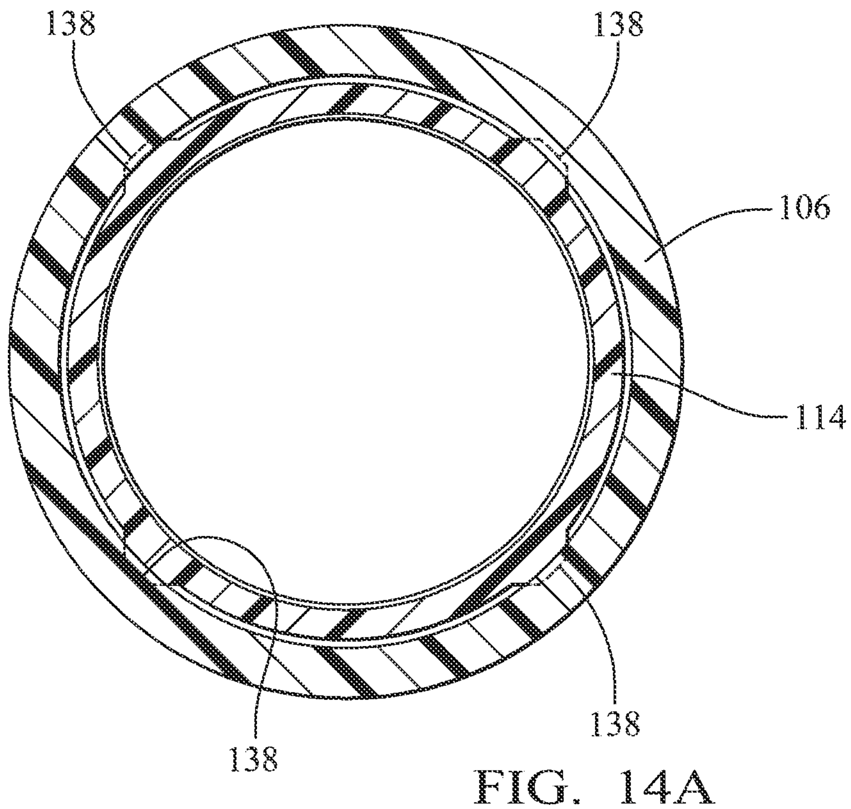
FIG. 14A shows a cross section view of the electrical connector of FIG. 1 and the mating connector along the section line 14A-14A of FIG. 13B according to some embodiments.
Figure 14B:
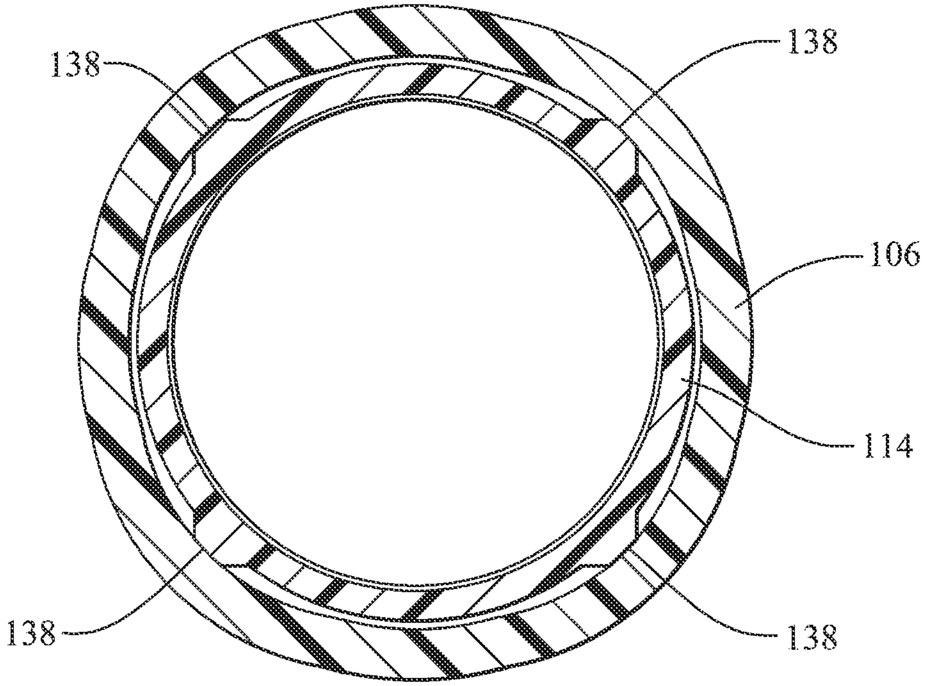
FIG. 14B shows a cross section view of the electrical connector of FIG. 1 along the section line 14B-14B of FIG. 13B illustrating deformation of the mating connector caused by the precision pads of the electrical connector of FIG. 1 according to some embodiments.

A first non-limiting example of an electrical connector assembly 100 is illustrated in FIGS. 1-14B.

This electrical connector assembly 100 addresses the problem of vibration between mating electrical connectors. The electrical connector assembly 100 includes a first electrical connector 102 that has a first electrical connector housing 104 that is configured to retain an electrical terminal 108. The first electrical connector housing 104 has a first shroud 106 that surrounds the electrical terminal 108. The electrical connector assembly 100 also includes a second electrical connector 110 having a second electrical connector housing 112 that is configured to retain a mating electrical terminal (not shown). The second electrical connector housing 112 has a second shroud 114 surrounding the mating electrical terminal that is configured to be received within the first shroud 106 of the first electrical connector housing 104. The second electrical connector housing 112 also includes a circular band 116 in the form of an open loop in which the first shroud is received 106. The circular band 116 has a gap 118 between the ends of the circular band 116. The circular band 116 applies a circumferential clamping force that grips the first shroud 106 when the gap 118 is narrowed by a lateral force $F_1$ that is applied to the second electrical connector housing 112, thereby decreasing the effective internal diameter of the circular band 116.

The second electrical connector 110 further includes a sliding member, which in the illustrated example is a connector position assurance (CPA) device 120, that is attached to the second electrical connector housing 112 and is movable in a longitudinal direction along the mating axis X of the first and second electrical connectors 102, 110. The CPA device 120 has a pair of first ramped surfaces 122 and the second electrical connector housing 112 defines a pair of corresponding second ramped surfaces 124. These first and second ramped surfaces 122, 124 are angled relative to the mating axis X and cooperate to translate a longitudinal force $F_2$ applied to the CPA device 120 into the lateral force $F_1$ applied to the second electrical connector housing 112 that narrows the gap 118.

The CPA device 120 is held in a pre-staged position 126 until it is released by a lock nib 128 defined by the first shroud 106 to move in the longitudinal direction X from the pre-staged position 126 to a staged position 130 as the first shroud 106 is inserted within the second shroud 114. The second electrical connector housing 112 includes a locking arm 132 that configured to engage the lock nib 128 and retain the first and second electrical connectors 102, 110 in a fully mated condition. The CPA device 120 is configured to inhibit the locking arm 132 from releasing the lock nib 128 once the CPA device 120 is moved to the staged position 130. The locking arm 132 may release the lock nib 128 once the CPA device 120 is returned to the pre-staged position 126.

The second electrical connector housing 112 defines a pair of third ramped surfaces 134 extending from a trailing edge of the gap 118 that engage and cooperate with the lock nib 128 to pull the first electrical connector housing 104 and the second electrical connector housing 112 together in response to the lateral force $F_1$ applied to the second electrical connector housing 112 as the gap 118 is narrowed. The third ramped surfaces 134 are angled relative to the mating axis X and cooperate to translate the lateral force $F_1$ caused by narrowing the gap to another longitudinal force $F_3$ acting in the opposite direction of the longitudinal force $F_2$ applied to the CPA device 120. The second electrical connector housing 112 also defines a pair of fourth ramped surfaces 136 extending into a leading edge of the gap 118 that engage and cooperate with the lock nib 128 to open the gap 118 as the first shroud 106 is inserted within the second shroud 114.

The second shroud 114 also defines a plurality of elongate precision pads 138 located near a base 140 of the second shroud 114, that is near the fixed end of the second shroud 114. These precision pads 138 are configured to be in an interference fit with the first shroud 106. The precision pads 138 are configured to deform the first shroud 106 more than the first shroud 106 deforms the precision pads 138, i.e., the precision pads 138 do not serve as crush ribs and are not the elements that are primarily deformed when the first shroud 106 is inserted within the second shroud 114. The precision pads 138 are evenly spaced around the base 140 of the second shroud 114 and are preferably include four pads 138 spaced at 90 degree intervals around the base 140 of the second shroud 114.

The electrical connector assembly 100 described herein provides the benefits of minimizing relative motion between the first and second connector housings 104, 112 by circular band 116 clamping the first and second connector housings together 104, 112. This clamping also minimizes axial movement between the first and second connector housings 104, 121 caused by connector lock overtravel, i.e., engagement between the locking arm 132 and the lock nib 128. The mating force required to engage the first and second electrical connectors 102, 110 is not increased by the clamping resulting from engagement of the circular band 116. The clamping action of the circular band 116 and the interference fit of the precision pads 138 provide two axially distant locations that minimize relative axial wobble between the first and second connector housings 104, 112.

Figure 15:
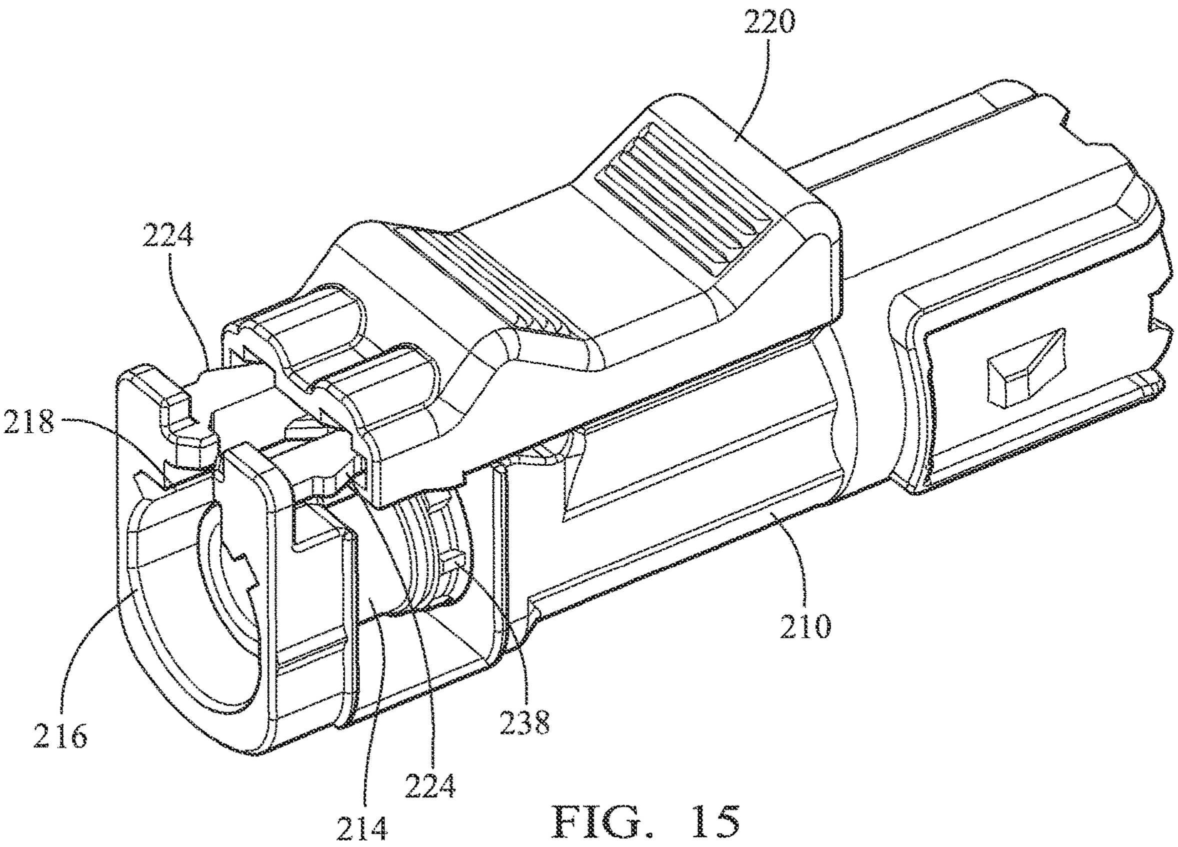
FIG. 15 shows a perspective view of another electrical connector with a clamping connector lock according to some embodiments.
Figure 16:
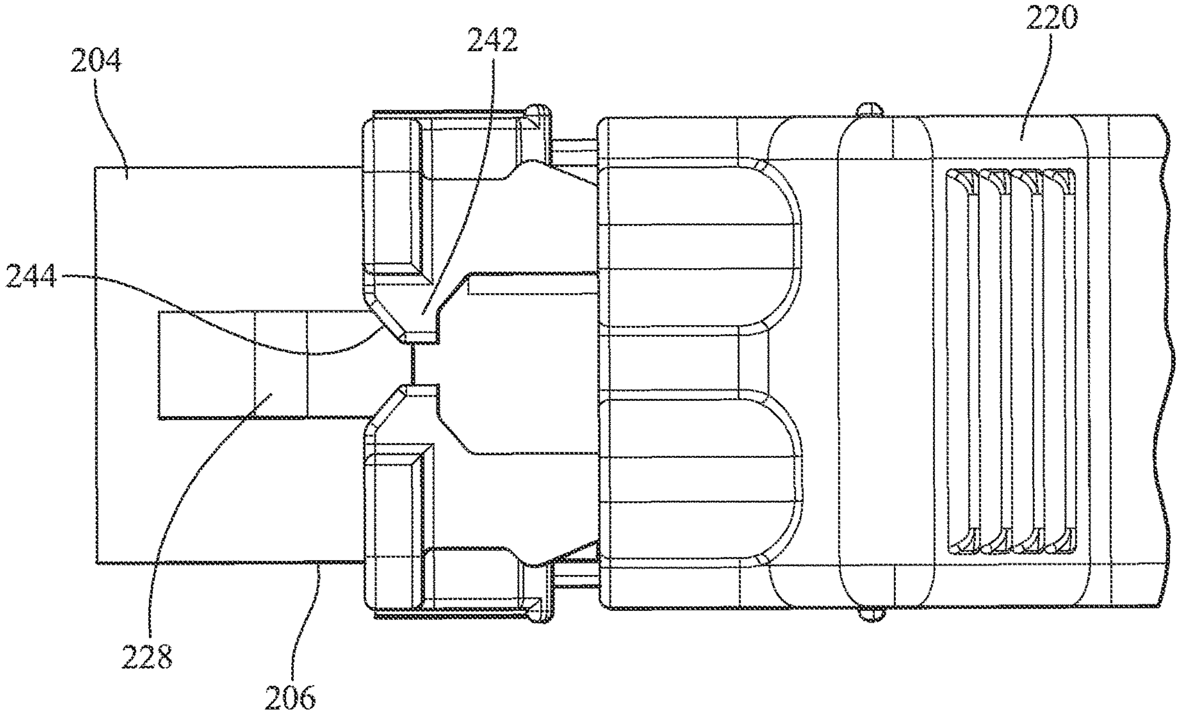
FIG. 16 shows a top view of the electrical connector of FIG. 15 according to some embodiments.
Figure 17:
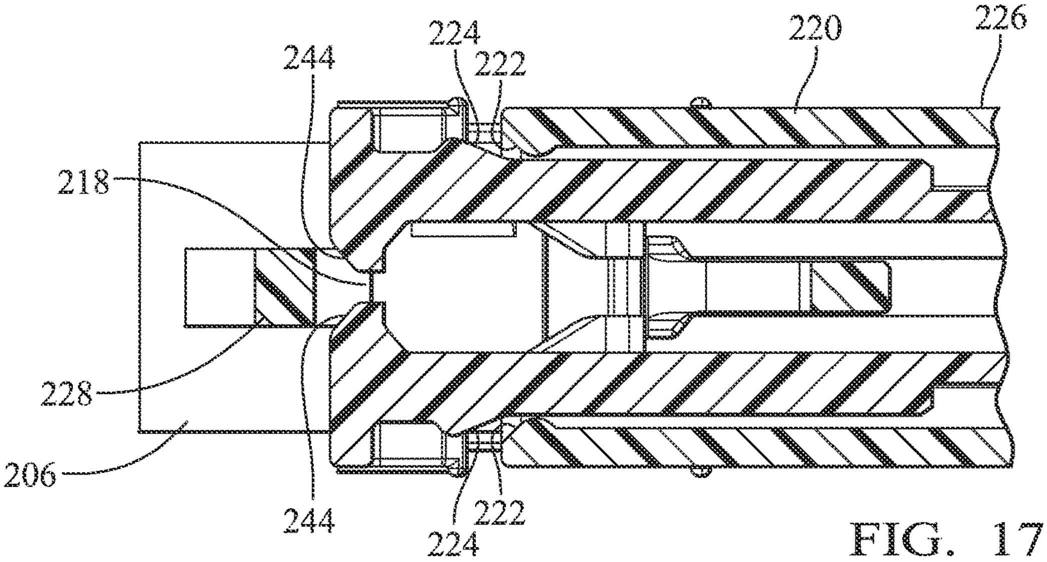
FIG. 17 shows a top view of the electrical connector of FIG. 15 partially mated with a mating connector with the CPA clamp in cross section according to some embodiments.
Figure 18:
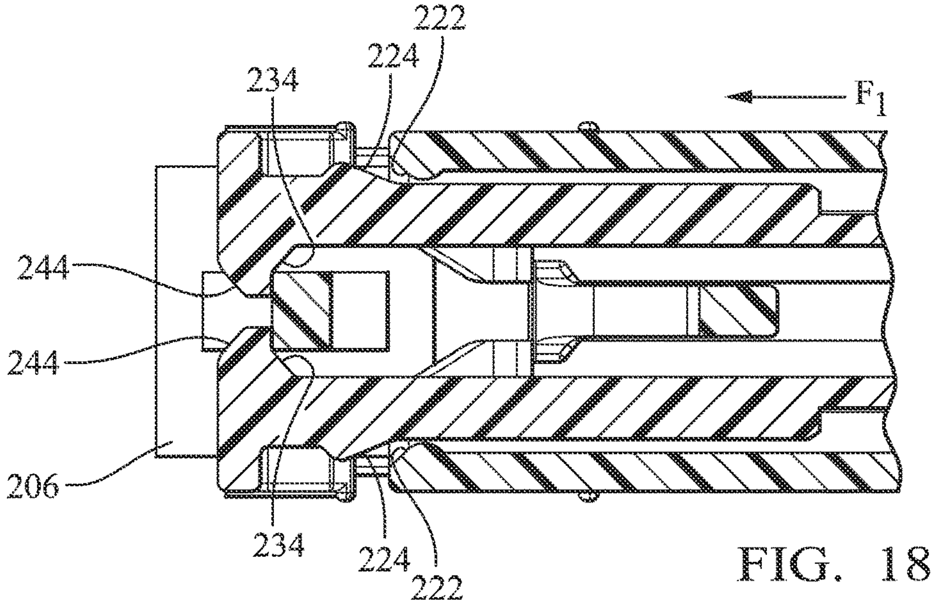
FIG. 18 shows a top view of the electrical connector of FIG. 15 partially mated with a mating connector with the CPA clamp in cross section and in a released position according to some embodiments.
Figure 19:
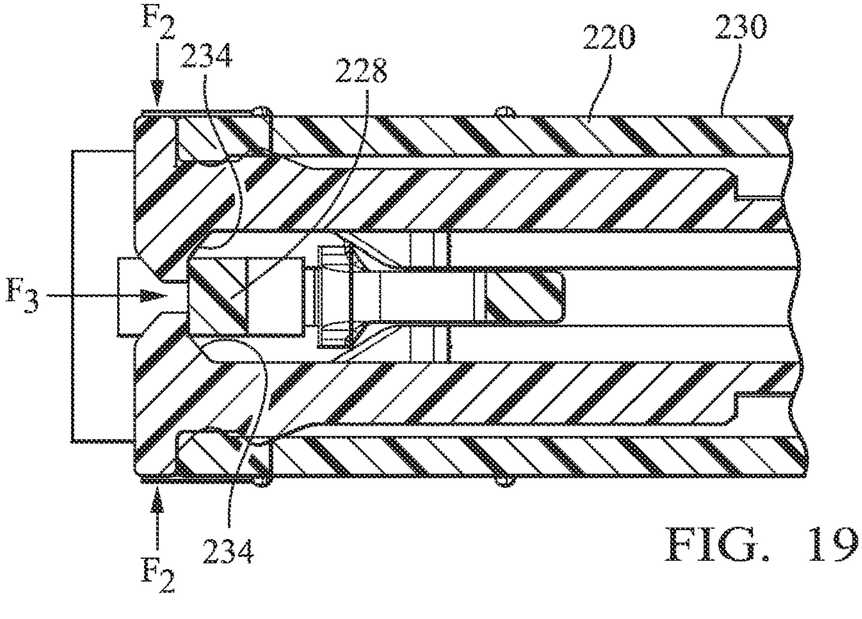
FIG. 19 shows a top view of the electrical connector of FIG. 15 partially mated with a mating connector with the CPA clamp in cross section and in a seated position according to some embodiments.

A second non-limiting example of an electrical connector assembly 200 with a clamping connector lock is described herein and is illustrated in FIGS. 15-20.

This electrical connector assembly 200 incorporates a connector locking feature with the clamping connector lock. A connector lock 242 engages a locking nib 228 on a shroud 206 and a CPA device 220 inhibits the connector lock 242 from releasing the locking nib 228 by blocking outward flexing of the connector lock 242. This electrical connector assembly 200 does not include a separate lock arm as shown in FIGS. 1-14B.

This electrical connector assembly 200 also addresses the problem of vibration between mating electrical connectors. The electrical connector assembly 200 includes a first electrical connector 202 that has a first electrical connector housing 204 that is configured to retain an electrical terminal (not shown). The first electrical connector housing 204 has a first shroud 206 that surrounds the electrical terminal. The electrical connector assembly 200 also includes a second electrical connector 210 having a second electrical connector housing 212 that is configured to retain a mating electrical terminal (not shown). The second electrical connector housing 212 has a second shroud 214 surrounding the mating electrical terminal that is configured to be received within the first shroud 206 of the first electrical connector housing 204. The second electrical connector housing 212 also includes a circular band 216 in the form of an open loop in which the first shroud 206 is received. The circular band 216 has a gap 218 between the ends of the circular band 216. The circular band 216 applies a circumferential clamping force that grips the first shroud 206 when the gap 218 is narrowed by a lateral force $F_1$ that is applied to the second electrical connector housing 212, thereby decreasing the effective internal diameter of the circular band 216.

The second electrical connector 210 further includes a sliding member, which in the illustrated example is a connector position assurance (CPA) device 220, that is attached to the second electrical connector housing 212 and is movable in a longitudinal direction along the mating axis X of the first and second electrical connectors 202, 210. The CPA device 220 has a pair of first ramped surfaces 222 and the second electrical connector housing 212 defines a pair of corresponding second ramped surfaces 224. These first and second ramped surfaces 222, 224 are angled relative to the mating axis X and cooperate to translate a longitudinal force $F_2$ applied to the CPA device 220 into the lateral force $F_1$ applied to the second electrical connector housing that narrows the gap.

The second electrical connector housing 212 defines a pair of third ramped surfaces 234 extending from a trailing edge of the gap 218 that engage and cooperate with the lock nib 228 to pull the first electrical connector housing 204 and the second electrical connector housing 212 together in response to the lateral force $F_1$ applied to the second electrical connector housing 212 as the gap 218 is narrowed. The third ramped surfaces 234 are angled relative to the mating axis X and cooperate to translate the lateral force $F_1$ caused by narrowing the gap to another longitudinal force $F_3$ acting in the opposite direction of the longitudinal force $F_2$ applied to the CPA device 220.

The second electrical connector housing 212 also defines a pair of fourth ramped surfaces 244 extending into a leading edge of the gap 218 that engage and cooperate with the locking nib 228 to open the gap as the first shroud 206 is inserted within the second shroud 214. The CPA device 220 is configured to inhibit the gap 218 from opening when the CPA device 220 is moved from a pre-staged position 226 to a staged position 230.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector assembly, comprising:

a first electrical connector housing configured to retain an electrical terminal, the first electrical connector housing having a first shroud surrounding the electrical terminal;

a second electrical connector housing configured to retain a mating electrical terminal, the second electrical connector housing having a second shroud surrounding the mating electrical terminal configured to be received within the first shroud, the second electrical connector housing comprising a circular band in which the first shroud is received, the circular band defining a gap therein and configured to apply a circumferential clamping force to the first shroud when the gap is narrowed by a lateral force applied to the second electrical connector housing, thereby decreasing an effective internal diameter of the circular band; and a sliding member attached to the second electrical connector housing that is movable in a longitudinal direction, the sliding member defining a first ramped surface and the second electrical connector housing defines a second ramped surface that cooperates with the first ramped surface to translate a longitudinal force applied to the sliding member to the lateral force applied to the second electrical connector housing, the sliding member being held in a position until released to move in the longitudinal direction by a lock nib defined by the first shroud as the second shroud is inserted within the first shroud.

2. The electrical connector assembly according to claim 1, wherein the sliding member comprises a connector position assurance device.

3. The electrical connector assembly according to claim 1, wherein the second electrical connector housing includes a locking arm configured to engage the lock nib and retain the first and second electrical connector housing in a fully mated condition.

4. The electrical connector assembly according to claim 1, wherein the second shroud defines a plurality of elongate pads located proximate a base of the second shroud that are configured to be in an interference fit with the first shroud.

5. The electrical connector assembly according to claim 4, wherein the plurality of elongate pads are configured to deform the first shroud more than the first shroud deforms the plurality of elongate pads.

6. The electrical connector assembly according to claim 4, wherein the plurality of elongate pads are evenly spaced around the base of the second shroud.

7. The electrical connector assembly according to claim 4, wherein the plurality of elongate pads comprises four pads spaced at 90 degree intervals around the base of the second shroud.

8. An electrical connector assembly, comprising:

a first electrical connector housing configured to retain an electrical terminal, the first electrical connector housing having a first shroud surrounding the electrical terminal;

a second electrical connector housing configured to retain a mating electrical terminal, the second electrical connector housing having a second shroud surrounding the mating electrical terminal configured to be received within the first shroud, the second electrical connector housing comprising a circular band in which the first shroud is received, the circular band defining a gap therein and configured to apply a circumferential clamping force to the first shroud when the gap is narrowed by a lateral force applied to the second electrical connector housing, thereby decreasing an effective internal diameter of the circular band; and a sliding member attached to the second electrical connector housing that is movable in a longitudinal direction, the sliding member defining a first ramped surface and the second electrical connector housing defines a second ramped surface that cooperates with the first ramped surface to translate a longitudinal force applied to the sliding member to the lateral force applied to the second electrical connector housing, the first shroud defining a lock nib that cooperates with a third ramped surface defined by the second electrical connector housing to pull the first electrical connector housing and the second electrical connector housing together in response to the lateral force applied to the second electrical connector housing.

9. An electrical connector assembly, comprising:

a first electrical connector housing configured to retain an electrical terminal, the first electrical connector housing having a first shroud surrounding the electrical terminal and lock nib extending from the first shroud;

a second electrical connector housing configured to retain a mating electrical terminal, the second electrical connector housing having a second shroud surrounding the mating electrical terminal configured to be received within the first shroud, wherein the second electrical connector housing defines a gap therein that is narrowed by a lateral force applied to the second electrical connector housing; and a sliding member attached to the second electrical connector housing that is movable in a longitudinal direction, wherein the sliding member defines a first ramped surface and the second electrical connector housing defines a second ramped surface that cooperates with the first ramped surface to translate a longitudinal force applied to the sliding member to the lateral force applied to the second electrical connector housing, thereby narrowing the gap in the second electrical connector housing, wherein the lock nib cooperates with a ramped surface defined by the second electrical connector housing to pull the first electrical connector housing and the second electrical connector housing together as the gap is narrowed in response to the lateral force applied to the second electrical connector housing.

10. The electrical connector assembly according to claim 9, wherein the sliding member is a connector position assurance device.

11. The electrical connector assembly according to claim 10, wherein the connector position assurance device is held in a position until released to move in the longitudinal direction by the lock nib as the second shroud is inserted within the first shroud.

12. The electrical connector assembly according to claim 11, wherein the second electrical connector housing includes a locking arm configured to engage the lock nib and retain the first and second electrical connector housing in a fully mated condition.

13. An electrical connector assembly, comprising:

a first electrical connector housing configured to retain an electrical terminal, the first electrical connector housing having a first shroud surrounding the electrical terminal; and a second electrical connector housing configured to retain a mating electrical terminal and having a second shroud surrounding the mating electrical terminal configured to be received within the first shroud, the second shroud defining a plurality of elongate pads located proximate a base of the second shroud that are configured to be in an interference fit with the first shroud, the plurality of elongate pads being configured to deform the first shroud more than the first shroud deforms the plurality of elongate pads.

14. The electrical connector assembly according to claim 13, wherein the plurality of elongate pads are evenly spaced around the base of the second shroud.

15. The electrical connector assembly according to claim 13, wherein the plurality of elongate pads comprises four pads spaced at 90 degree intervals around the base of the second shroud.

* * * * *